(12) United States Patent
Guo et al.

(10) Patent No.: US 11,372,075 B2
(45) Date of Patent: Jun. 28, 2022

(54) POSITIONING METHOD, APPARATUS AND SYSTEM, LAYOUT METHOD OF POSITIONING SYSTEM, AND STORAGE MEDIUM

(71) Applicant: ZTE CORPORATION, Guangdong (CN)

(72) Inventors: Dandan Guo, Guangdong (CN); Wenyuan Cheng, Guangdong (CN); Xiong Tang, Guangdong (CN); Rui Huang, Guangdong (CN)

(73) Assignee: ZTE CORPORATION

( * ) Notice: Subject to any disclaimer, the term of this patent is extended or adjusted under 35 U.S.C. 154(b) by 290 days.

(21) Appl. No.: 16/627,849

(22) PCT Filed: Jul. 20, 2018

(86) PCT No.: PCT/CN2018/096496
§ 371 (c)(1),
(2) Date: Dec. 31, 2019

(87) PCT Pub. No.: WO2019/015678
PCT Pub. Date: Jan. 24, 2019

(65) Prior Publication Data
US 2020/0124695 A1 Apr. 23, 2020

(30) Foreign Application Priority Data
Jul. 21, 2017 (CN) .......................... 201710602284.5

(51) Int. Cl.
*G01S 5/14* (2006.01)
*G01S 5/02* (2010.01)
*G01S 5/16* (2006.01)

(52) U.S. Cl.
CPC .......... *G01S 5/0252* (2013.01); *G01S 5/0221* (2013.01); *G01S 5/16* (2013.01)

(58) Field of Classification Search
CPC .. G01S 5/0252; G01S 5/0221; G01S 5/02213; G01S 5/14
(Continued)

(56) References Cited

U.S. PATENT DOCUMENTS 9,551,780 B1 * 1/2017 Fan ................... G06K 7/10158
2009/0237210 A1 * 9/2009 Ciesla ................. H04W 68/005
340/10.1

FOREIGN PATENT DOCUMENTS

CN 101793962 8/2010
CN 101957447 1/2011
(Continued)

OTHER PUBLICATIONS

Extended European Search Report dated Dec. 23, 2020; European Patent Application No. 18835105.0.
(Continued)

*Primary Examiner* — Harry K Liu
(74) *Attorney, Agent, or Firm* — McDonald Hopkins LLC

(57) ABSTRACT

Provided are a positioning method, apparatus and system, a layout method for a positioning system and a storage medium. A plurality of labels is laid with preset positioning precision in an area to be positioned, where each label among the plurality of labels carries label information, where the label information corresponds to position information of a position of the each label. A position acquisition device reads first label information on a label at a distance not greater than the preset positioning precision from the position acquisition device; and the position acquisition device determines first position information of the position acquisition device according to the first label information.

12 Claims, 3 Drawing Sheets

(58) Field of Classification Search
USPC .......................................................... 342/451
See application file for complete search history.

(56) References Cited

FOREIGN PATENT DOCUMENTS

| | | | |
|---|---|---|---|
| CN | 101551454 B | 6/2011 | |
| CN | 102867163 A | 1/2013 | |
| CN | 103093162 | 5/2013 | |
| CN | 105158726 | 12/2015 | |
| CN | 106597360 | 4/2017 | |
| JP | 2007033119 A | 2/2007 | |
| JP | 2007164441 A | 6/2007 | |
| JP | 2010066171 A | 3/2010 | |
| WO | WO-2005086072 A1 * | 9/2005 | ......... G06K 7/10366 |
| WO | 2006065563 A2 | 6/2006 | |
| WO | WO-2013017596 A1 * | 2/2013 | ......... G06K 7/10366 |

OTHER PUBLICATIONS

English Translation of Office Action dated Dec. 23, 2020; Japanese Patent Application No. 2019-568640.
Patent Cooperation Treaty (PCT), International Search Report and Written Opinion for Application PCT/CN2018/096496 filed Jul. 20, 2018, dated Oct. 26, 2018, International Searching Authority, CN.

* cited by examiner

POSITIONING METHOD, APPARATUS AND SYSTEM, LAYOUT METHOD OF POSITIONING SYSTEM, AND STORAGE MEDIUM

CROSS-REFERENCE TO RELATED APPLICATION

This application is a 35 U.S.C. 371 national stage filing of PCT Application No. PCT/CN2018/096496 filed on Jul. 20, 2018, which claims priority to Chinese patent application No. 201710602284.5 filed on Jul. 21, 2017, disclosure of which are incorporated herein by reference in their entirety.

TECHNICAL FIELD

The present disclosure relates to positioning technologies, for example, to a positioning method, apparatus and system, a layout method for a positioning system and a storage medium.

BACKGROUND

A positioning technology has a wide range of applications and is implemented in various manners. Related positioning technologies include a Global Navigation Satellite System (GNSS), radio multipoint ranging, a camera, wireless fidelity (WiFi) positioning, an automated guided vehicle (AGV), and the like. The AGV is mainly applied to an automatic production line, and other positioning technologies are basically applied to indoor navigation. For a technical reason, a positioning method in the related art has limited application due to insufficient positioning precision.

SUMMARY

The present application provides a positioning method, apparatus, system, a layout method for a positioning system and a storage medium, to improve positioning precision.

Embodiments of the present application provide a layout method for a positioning system. The method includes a step described below. A plurality of labels is laid with preset positioning precision in an area to be positioned, where each label among the plurality of labels carries label information, where the label information corresponds to position information of a position of the each label.

Embodiments of the present application provide a positioning system. The system includes a plurality of labels. The plurality of labels is laid with preset positioning precision, where each label among the plurality of labels carries label information, where the label information corresponds to position information of a position of the each label.

At least one embodiment of the present application provides a positioning method, which is applied to a system including a plurality of labels laid with preset positioning precision in an area to be positioned. Each label among the plurality of labels carries label information, where the label information corresponds to position information of a position of the each label. The method includes steps described below. A position acquisition device reads first label information on a label at a distance not greater than the preset positioning precision from the position acquisition device. The position acquisition device determines first position information of the position acquisition device according to the first label information.

At least one embodiment of the present application provides a positioning method, which is applied to a positioning system including a plurality of labels laid with preset positioning precision in an area to be positioned. Each label among the plurality of labels carries label information, where the label information corresponds to position information of a position of the each label. The method includes steps described below. A position monitoring device receives first label information sent by a position acquisition device, where the first label information is on a label at a distance not greater than the preset positioning precision from the position acquisition device. The position monitoring device determines first position information of the position acquisition device according to the first label information.

At least one embodiment of the present application provides a positioning apparatus, which is applied to a positioning system including a plurality of labels laid with preset positioning precision in an area to be positioned. Each label among the plurality of labels carries label information, where the label information corresponds to position information of a position of the each label. The apparatus includes a label reading module. The label reading module is configured to read first label information on a label at a distance not greater than the preset positioning precision from a position acquisition device.

At least one embodiment of the present application provides a positioning apparatus, which is applied to a positioning system including a plurality of labels laid with preset positioning precision in an area to be positioned. Each label among the plurality of labels carries label information, where the label information corresponds to position information of a position of the each label. The apparatus includes a memory, a processor and a label reading module.

The memory stores a positioning program. The processor is configured to: when reading and executing the positioning program stored in the memory, send an instruction to the label reading module, instruct the label reading module to read first label information on a label at a distance not greater than the preset positioning precision from a position acquisition device, and receive the first label information returned by the label reading module. The label reading module is configured to read the first label information on the label with the distance not greater than the preset positioning precision from the position acquisition device and send the first label information to the processor according to the instruction of the processor.

At least one embodiment of the present application provides a positioning apparatus, which is applied to a positioning system including a plurality of labels laid with preset positioning precision in an area to be positioned. Each label among the plurality of labels carries label information, where the label information corresponds to position information of a position of the each label. The apparatus includes a second communication module and a position analyzing module.

The second communication module is configured to receive first label information sent by a position acquisition device and send the first label information to the position analyzing module, where the first label information is on a label at a distance not greater than the preset positioning precision from the position acquisition device. The position analyzing module is configured to determine first position information of the position acquisition device according to the first label information.

At least one embodiment of the present application provides a positioning apparatus, which is applied to a system including a plurality of labels laid with preset positioning precision in an area to be positioned. Each label among the plurality of labels carries label information, where the label information corresponds to position information of a position of the each label. The positioning apparatus includes a memory and a processor. The memory stores a program, which, when read and executed by the processor, performs operations described below. First label information sent by a position acquisition device is received, where the first label information is on a label at a distance not greater than the preset positioning precision from the position acquisition device. First position information of the position acquisition device is determined according to the first label information.

At least one embodiment of the present application provides a computer-readable storage medium, which is configured to store at least one program. The at least one program may be executed by at least one processor to implement steps described below. An instruction in sent to a label reading module to instruct the label reading module to read first label information on a label at a distance not greater than preset positioning precision from a position acquisition device. The first label information returned by the label reading module is received. First position information of the position acquisition device is determined according to the first label information.

At least one embodiment of the present application provides a computer-readable storage medium, which is configured to store at least one program. The at least one program may be executed by at least one processor to implement steps described below. First label information sent by a position acquisition device is received, where the first label information is on a label at a distance not greater than preset positioning precision from the position acquisition device. First position information of the position acquisition device is determined according to the first label information.

Compared with the related art, the present application achieves a positioning precision which is the same as layout precision of the labels and improves the positioning precision by laying the labels with the preset positioning precision reading the labels for positioning.

Additional features and advantages of the present application will be set forth in the description which follows, or may be learned by practice of the present application. The object and other advantages of the present application may be achieved and obtained through structures set forth in the description, claims and drawings.

DETAILED DESCRIPTION

Figure 1:
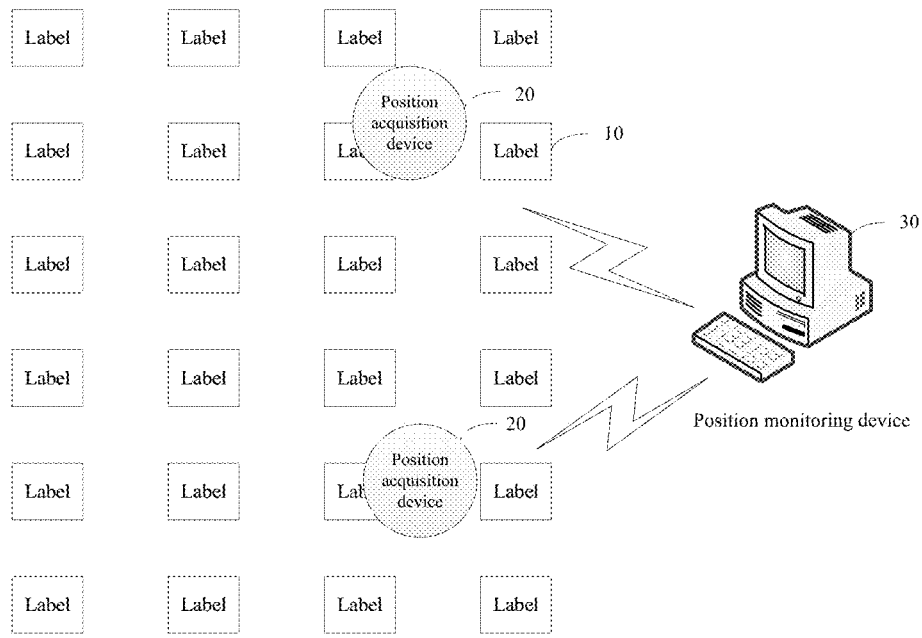
FIG. 1 is an overall structural diagram according to an embodiment of the present application.

The steps shown in the flowcharts among the drawings may be performed by a computer system such as a group of computers capable of executing instructions. Although logical sequences are shown in the flowcharts, the shown or described steps may be performed in sequences different from those described herein in some cases.

In related positioning technologies, a GNSS has no signal indoors and is difficult to provide positioning with precision higher than 3 meters. A radio multipoint ranging method requires high-precision synchronization and needs to build and maintain a base station; and a radio wave is multipath and may be blocked, and thus is unable to achieve full coverage. A camera has a blocked blind area, can only determine a position of an object, and cannot notify the object of the position of the object.

An AGV used in industry is prevented from being separated from a predetermined track by laying a magnetic stripe track, laying an optical track, optically identifying a laser mark and optically identifying two-dimensional code information by resolving parallax deformation, and in other manners. These manners are mainly applied to the predetermined track in an industrial field, and have defects of a blocked blind area, a complex visual identification and the like.

In the present application, a label with a unique identification is introduced into a positioned system, where the label includes, but is not limited to, a radio frequency identification (RFID) label, a magnetic strip label and an optical label. The label is laid with preset positioning precision, so that at least one label exists in each preset positioning precision range in an area to be positioned. Label information is read, and a precise position of the label is obtained directly according to the label information or obtained by converting the label information. The present application is described below through embodiments.

An embodiment of the present application provides a layout method for a positioning system. The method includes a step described below.

A plurality of labels is laid with preset positioning precision in an area to be positioned, where each label among the plurality of labels carries label information, where the label information corresponds to position information of a position of the each label.

The area to be positioned may refer to a moving area of a position acquisition device, and the position acquisition device is positioned in the area.

The step of laying the plurality of labels with the preset positioning precision in the area to be positioned includes: laying the plurality of labels in the area to be positioned, so that for any position in the area to be positioned, at least one label at a distance not greater than the preset positioning precision from the position exists, or at least one label exists within a range with any point in the area to be positioned as center and with the preset positioning precision as a radius. In the layout method provided by the embodiment, layout precision of the labels is the same as positioning precision, so that when positioning is performed based on the labels, the positioning precision which is the same as the layout precision of the labels is achieved, that is, the layout precision of the label is improved to achieve the purpose of improving the positioning precision.

A layout manner is to form a coordinate system with the labels. Each label represents a point in the coordinate system and precision of the coordinate system is the preset positioning precision.

For example, when the preset positioning precision is 1 cm, one label is laid every 1 cm in a horizontal direction and a vertical direction.

For example, the label includes at least one of: an RFID label, a magnetic stripe label, or an optical label. The present application is not limited thereto, and another label that may carry information and be identified may also be used.

For example, the labels may be laid in one of manners described below.

A net or a film including the plurality of labels is laid on a surface of an object with the labels to be laid.

The plurality of labels is laid in a label array on the surface of the object with the labels to be laid.

The plurality of labels is printed on the surface of the object with the labels to be laid before the object is laid or after the object is laid.

The plurality of labels is implanted into the object with the labels to be laid in advance, and then the object is laid. For example, after the plurality of labels is implanted into a floor precast block, and then the floor precast block is laid.

The object with the labels to be laid may be the ground or a surface of an object reachable by another position acquisition device.

For example, in order to protect the labels, after the plurality of labels is laid, a protective layer may be laid over the plurality of labels. Of course, the protective layer may not be laid if the labels have adequate strength or the labels are implanted in advance.

For example, the label information includes the position information of the position of the each label. The position information may be encoded position information, and the position information may be obtained by decoding the encoded position information. Alternatively, the position information may be non-encoded position information, and the position information may be obtained by directly reading the label information. Alternatively, the position information may include position conversion information of the position of the each label, and the position information may be obtained by querying a database according to the position conversion information.

For example, the position information may be practical geographic position information or custom logical position information. An embodiment of the present application provides a positioning system. As shown in FIG. 1, the position system includes a plurality of labels 10.

The plurality of labels 10 is laid with preset positioning precision in an area to be positioned. Each label 10 carries label information, where the label information corresponds to position information of a position of the each label 10.

For example, the system may further include a protective layer over the labels 10.

Other details may refer to the embodiment described above and are not described in detail herein.

A label layout manner shown in FIG. 1 is only an example, and the labels may be laid in other manners as required, which is not limited in the present application.

As shown in FIG. 1, the positioning system may include a position acquisition device 20 and a position monitoring device 30. The position acquisition device may be a mobile terminal, and may also be various devices in the industry such as an automatic robot. The position acquisition device 20 reads label information on the label, performs positioning according to the label information, and sends the position information to the position monitoring device 30. Alternatively, the position acquisition device 20 sends the label information to the position monitoring device 30, and the position monitoring device 30 performs the positioning according to the label information.

Implementation of the positioning by the position acquisition device is described below.

Figure 2:
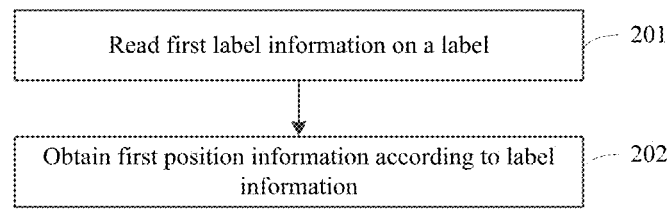
FIG. 2 is a flowchart of a positioning method according to an embodiment of the present application.

An embodiment of the present application provides a positioning method, which is applied to a positioning system including a plurality of labels laid with preset positioning precision in an area to be positioned. Each label among the plurality of labels carries label information, where the label information corresponds to position information of a position of the each label. As shown in FIG. 2, the positioning method includes steps 201 and 202.

In step 201, the position acquisition device reads first label information on a first label at a distance not greater than the preset positioning precision from the position acquisition device.

In step 202, the position acquisition device determines first position information of the position acquisition device according to the first label information.

In this embodiment, at any position, at least one label exists in an area with the position as a center and with the preset positioning precision as a radius, and the position acquisition device just needs to read the label information. If multiple labels exist, the position acquisition device only needs to read one of the multiple labels. The position acquisition device may be configured, so that the position acquisition device reads only a label within a certain distance range (e.g., the preset positioning precision). Taking an RFID label as an example, strength of a radio frequency signal may be controlled, so that the position acquisition device reads only the label within a range of the preset positioning precision.

In an optional embodiment of the present application, the step in which the position acquisition device determines the first position information of the position acquisition device according to the first label information includes a step described below.

The position acquisition device directly determines the first position information of the position acquisition device according to the first label information, where the first label information includes position information of a position of the first label.

Alternatively, the position acquisition device queries a database according to the first label information, and acquires position information corresponding to the first label information from the database as the first position information of the position acquisition device.

In an embodiment of the present application, the method further includes a step described below.

When the position acquisition device is static, the position acquisition device reads, in a direction in which the position acquisition device intends to move, second label information on a label at a distance greater than the preset positioning precision from the position acquisition device, determines second position information according to the second label information, and determines a moving direction of the position acquisition device according to the first position information and the second position information. In an embodiment, the first position information and the second position information form a direction vector, so that the moving direction of the position acquisition device may be determined. Two card readers (for reading the label) may be configured, where the first label information read by one of the two card readers is used for determining a position of the position acquisition device, and the second label information read by the other card reader is used for determining a direction of the position acquisition device. Of course, one card reader may be used, and the card reader performs two operations to obtain the first label information and the second label information.

In an embodiment of the present application, the method further includes a step described below.

After the position acquisition device moves from a current position to a third position, the position acquisition device reads third label information on a label at a distance not greater than the preset positioning precision from the position acquisition device, determines third position information according to the third label information, and determines the moving direction of the position acquisition device according to the first position information and the third position information. In an embodiment, the first position information and the third position information form a direction vector, so that the moving direction of the position acquisition device may be determined.

If the label is an optical label, the optical label may carry a direction reference pattern, where the direction reference pattern points to a preset direction. In an optional embodiment of the present application, the method further includes a step described below.

The label includes the direction reference pattern, where the direction reference pattern points to the preset direction.

The first label information is a graph. The graph is rotated to enable a direction reference pattern in the graph to coincide with a direction reference pattern in a reference graph, and direction information of the position acquisition device is determined according to a rotated angle of the graph.

For example, the direction reference pattern is an arrow and the arrow points to the north when the label is laid. The direction reference pattern in the reference pattern points to the north, and a direction may be determined by comparing a graph acquired by the position acquisition device with the reference pattern (for example, a comparison manner may be rotation or other manners).

In an embodiment of the present application, the position acquisition device sends the first position information of the position acquisition device to a position monitoring device. The preceding moving direction may also be sent to the position monitoring device.

Compared with the related art, the present application has at least four advantages described below.

1. In the present application introduces a method for densely laying positioning labels and achieves precise positioning by identifying the labels with unique electronic, magnetic or optical label information.

2. The label introduced by the present application may be in a power-free state, and consumes no energy when it is not used.

3. The label introduced by the present application is precise position information, information does not need to be shared between each other, and networking is not needed between laid systems.

4. The label information introduced by the present application is exclusive, and additional time synchronization is not needed.

In an embodiment of the present application, positioning is performed by a position monitoring device.

Figure 3:
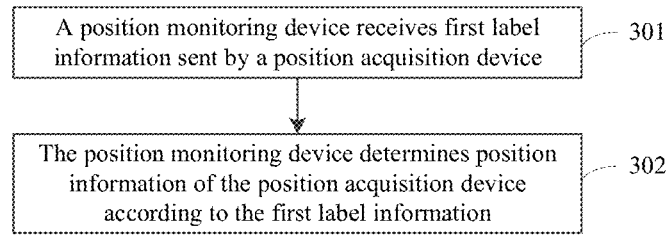
FIG. 3 is a flowchart of a positioning method according to an embodiment of the present application.

As shown in FIG. 3, this embodiment provides a positioning method, which is applied to a positioning system including a plurality of labels laid with preset positioning precision in an area to be positioned. Each label among the plurality of labels carries label information, and the label information corresponds to position information of a position of the each label. The method includes steps 301 and 302.

In step 301, the position monitoring device receives first label information sent by a position acquisition device, where the first label information is on a first label at a distance not greater than the preset positioning precision from the position acquisition device.

In step 302, the position monitoring device determines first position information of the position acquisition device according to the first label information.

In an embodiment of the present application, step 302 in which the position monitoring device determines the first position information of the position acquisition device according to the first label information includes a step described below.

The position monitoring device directly determines the first position information of the position acquisition device according to the first label information, where the first label information includes position information of a position of the first label.

The position monitoring device queries a database according to the first label information, and acquires position information corresponding to the first label information from the database as the first position information of the position acquisition device.

In an embodiment of the present application, the method further includes steps described below.

The position monitoring device receives second label information sent by the position acquisition device, where the second label information is on a second label in a direction in which the position acquisition device intends to move and at a distance greater than the preset positioning precision from the position acquisition device.

The position monitoring device determines second position information according to the second label information, and determines a moving direction of the position acquisition device according to the first position information and the second position information.

In an embodiment of the present application, the method further includes steps described below.

The position monitoring device receives third label information sent by the position acquisition device, where the third label information is on a third label at a distance not greater than the preset positioning precision from the position acquisition device after the position acquisition device moves from a current position to a third position.

The position monitoring device determines third position information according to the third label information, and determines the moving direction of the position acquisition device according to the first position information and the third position information.

Figure 4:
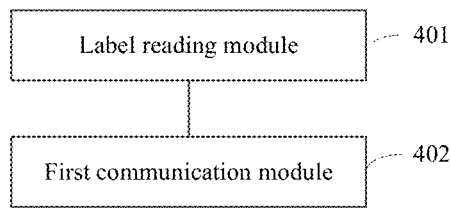
FIG. 4 is a block diagram of a positioning apparatus (on a position acquisition device side) according to an embodiment of the present application.

An embodiment of the present application provides a positioning apparatus, which is applied to a positioning system including a plurality of labels laid with preset positioning precision in an area to be positioned. Each label among the plurality of labels carries label information, where the label information corresponds to position information of a position of the each label. As shown in FIG. 4, the positioning apparatus includes a label reading module 401 and a first communication module 402.

The label reading module 401 is configured to read first label information on a first label at a distance not greater than the preset positioning precision from a position acquisition device.

The first communication module 402 is configured to send the first label information to a position monitoring device.

In an embodiment of the present application, the label reading module 401 is further configured to, when the position acquisition device is static, read, in a direction in which the position acquisition device intends to move, second label information on a second label at a distance greater than the preset positioning precision from the position acquisition device.

The first communication module 402 is further configured to send the second label information to the position monitoring device.

In an embodiment of the present application, the label reading module 401 is further configured to, when the position acquisition device moves from a current position to a third position, read third label information on a third label at a distance not greater than the preset positioning precision from the position acquisition device.

The first communication module 402 is further configured to send the third label information to the position monitoring device.

Figure 5:
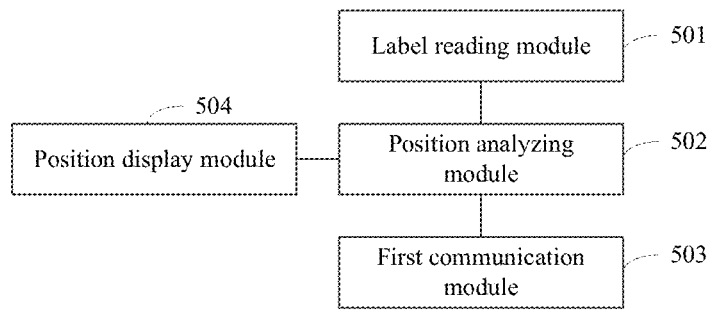
FIG. 5 is a block diagram of a positioning apparatus (on a position acquisition device side) according to an embodiment of the present application.

An embodiment of the present application provides a positioning apparatus, which is applied to a positioning system comprising a plurality of labels laid with preset positioning precision in an area to be positioned. Each label among the plurality of labels carries label information, where the label information corresponds to position information of a position of the each label. As shown in FIG. 5, the positioning apparatus includes a label reading module 501 and a position analyzing module 502.

The label reading module 501 is configured to read first label information on a first label at a distance not greater than the preset positioning precision from a position acquisition device and send the first label information to the position analyzing module 502.

The position analyzing module 502 is configured to determine first position information of the position acquisition device according to the first label information.

The positioning apparatus may further include a first communication module 503. The first communication module 503 is configured to send the first position information of the position acquisition device to a position monitoring device.

In an embodiment of the present application, the position analyzing module 502 determines the first position information of the position acquisition device according to the first label information in a manner described below.

The position analyzing module directly determines the first position information of the position acquisition device according to the first label information, where the first label information comprises position information of a position of the first label.

The position analyzing module 502 queries a database according to the first label information, and acquires position information corresponding to the first label information from the database as the first position information of the position acquisition device.

In an embodiment of the present application, the label reading module 501 is further configured to, when the position acquisition device is static, read, in a direction in which the position acquisition device intends to move, second label information on a second label at a distance greater than the preset positioning precision from the position acquisition device.

The position analyzing module 502 is further configured to determine second position information according to the second label information, and determine a moving direction of the position acquisition device according to the first position information and the second position information.

In an optional embodiment of the present application, the label reading module 501 is further configured to, when the position acquisition device moves from a current position to a third position, read third label information on a third label at a distance not greater than the preset positioning precision from the position acquisition device.

The position analyzing module 502 is further configured to determine third position information according to the third label information, and determine the moving direction of the position acquisition device according to the first position information and the third position information.

In an embodiment, a position display module 504 may be further included. The position display module 504 is configured to display the first position information of the position acquisition device, or the first position information and the moving direction.

Figure 6:
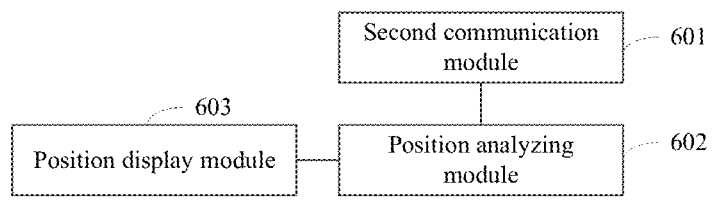
FIG. 6 is a block diagram of a positioning apparatus (on a position monitoring device side) according to an embodiment of the present application.

This embodiment provides a positioning apparatus, which is applied to a positioning system including a plurality of labels laid with preset positioning precision in an area to be positioned. Each label among the plurality of labels carries label information, where the label information corresponds to position information of a position of the each label. As shown in FIG. 6, the positioning apparatus includes a second communication module 601 and a position analyzing module 602.

The second communication module 601 is configured to receive first label information sent by a position acquisition device and send the first label information to the position analyzing module 602, where the first label information is on a first label at a distance not greater than the preset positioning precision from the position acquisition device.

The position analyzing module 602 is configured to determine first position information of the position acquisition device according to the first label information.

In an embodiment of the present application, the analyzing module 602 determines the first position information of the position acquisition device according to the first label information in a manner described below.

The first label information is position information, and the position analyzing module directly determines the first position information of the position acquisition device according to the first label information.

Alternatively, the position analyzing module queries a database according to the first label information, and acquires position information corresponding to the first label information from the database as the first position information of the position acquisition device.

In an embodiment of the present application, the second communication module 601 is further configured to receive second label information sent by the position acquisition device and send the second label information to the position analyzing module, where the second label information is on a second label in a direction in which the position acquisition device intends to move and at a distance greater than the preset positioning precision from the position acquisition device. The position analyzing module 602 is further configured to determine second position information according to the second label information, and determine a moving direction of the position acquisition device according to the first position information and the second position information.

In an embodiment of the present application, the second communication module 601 is further configured to receive third label information read by the position acquisition device after the position acquisition device moves from a current position to a third position, and send the third label information to the position analyzing module, where the third label information is on a third label at a distance not greater than the preset positioning precision from the position acquisition device.

The position analyzing module 602 is further configured to determine third position information according to the third label information, and determine the moving direction of the position acquisition device according to the first position information and the third position information.

In an embodiment of the present application, the positioning apparatus may further include a position display module 603. The position display module 603 is configured to display the first position information of the position acquisition device, or display the first position information and the moving direction of the position acquisition device.

Figure 7:
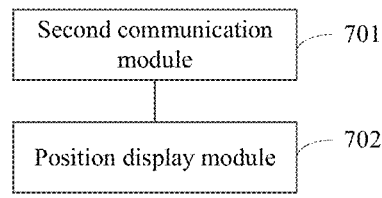
FIG. 7 is a block diagram of a positioning apparatus (on a position monitoring device side) according to an embodiment of the present application.

In another embodiment of the present application, as shown in FIG. 7, the positioning apparatus may also include only the second communication module 701 and the position display module 702. The second communication module 701 receives first position information sent by a position acquisition device, or the first position information and a moving direction. The position display module 702 displays received information, that is, displays the first position information of the position acquisition device, or displays the first position information and the moving direction of the position acquisition device.

Figure 8:
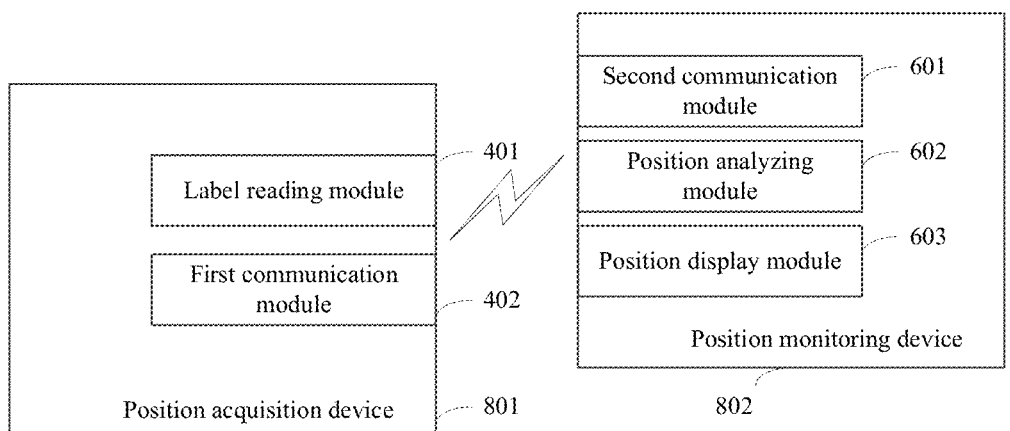
FIG. 8 is a block diagram of a positioning system according to an embodiment of the present application.

Another embodiment of the present application provides a positioning system. As shown in FIG. 8, the system includes a position acquisition device 801 and a position monitoring device 802. The position acquisition device 801 includes a label reading module 401 and a first communication module 402. The position monitoring device 802 includes a second communication module, a position analyzing module and a position display module. Positioning is performed by the position monitoring device 802. A function of each module may refer to the above-mentioned embodiments, and details are not described herein again.

Figure 9:
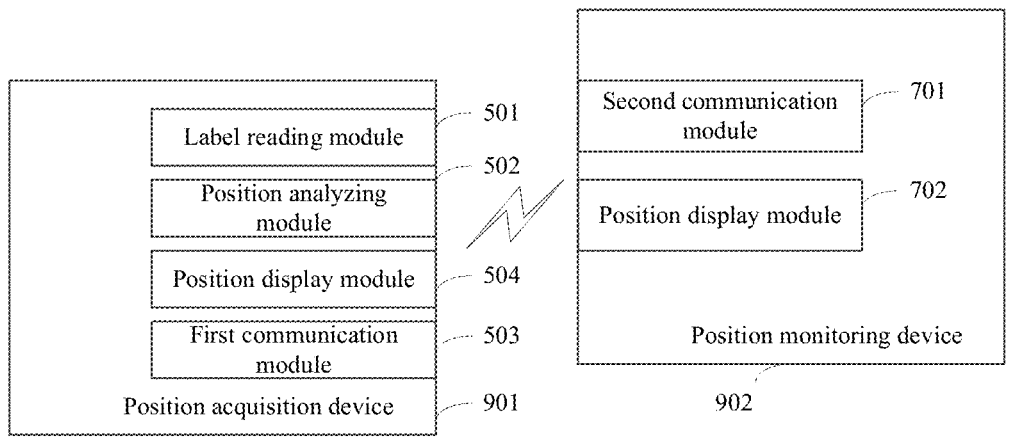
FIG. 9 is a block diagram of a positioning system according to an embodiment of the present application.

Another embodiment of the present application provides a positioning system. As shown in FIG. 9, the system includes a position acquisition device 901 and a position monitoring device 902. The position acquisition device 901 includes a label reading module 501, a position analyzing module 502 and a first communication module 503, and may further include a position display module 504. The position monitoring device 902 includes a second communication module 701 and a position display module 702. Positioning is performed by the position acquisition device 901. A function of each module may refer to the above-mentioned embodiments, and details are not described herein again.

The present application is further described below in conjunction with the drawings and embodiments.

In an embodiment of the present application, RFID labels are laid on the ground, and a laying interval may be determined according to preset positioning This embodiment provides a positioning method. The method includes steps 801 to 805.

In step 801, a label coordinate system is established.

In an embodiment, a relationship recording database of the RFID labels and position information is created.

In an embodiment, the RFID labels may be read and associated with the position information.

In an embodiment, the RFID labels are customized, and the position information is written into the RFID labels.

In step 802, a net or a film including the RFID labels is laid in an area to be positioned, or an RFID label array is laid in a manual laying manner or a machine laying manner.

In step 803, a ground protective layer is laid over the laid RFID label array.

In step 804, a position acquisition device reads label information on an RFID label on the ground to position the position acquisition device itself.

In an embodiment, the database is queried according to the label information to obtain corresponding position information. Alternatively, coordinate information in the label information on the RFID label is directly read.

In an embodiment, the method may further include that the position acquisition device continues moving, obtains a new position by the method in step 804, and obtains a moving direction of the position acquisition device according to a vector between an original position and the new position.

In an embodiment, the position acquisition device may obtain information on one direction vector by acquiring two pieces of position information (position information of a position of the position acquisition device, and position information corresponding to label information on a label located in a direction in which the position acquisition device intends to move and outside a range of the preset positioning precision), so as to obtain the moving direction of the position acquisition device. A direction card reader may be added to read the label information carried on the label located in the direction in which the position acquisition device intends to move and outside the range of the preset positioning precision.

In an embodiment, the moving direction of the position acquisition device may be acquired through a direction positioning device. The direction positioning device is configured to acquire a vector between a position before the position acquisition device moves and a position after the position acquisition device moves, to determine the moving direction of the position acquisition device.

In an embodiment, a direction (compass) may also be obtained through an earth magnetic field, and the labels may be laid with reference to a direction of the magnetic field. In an embodiment, an image recognition technology may be applied to identify the direction by extracting an information feature of an image, for example, when an optical label is used, information on the ground at a position of the optical label is scanned, and direction information of the position acquisition device is determined according to direction information indicated on the ground.

In step 805, the position acquisition device sends positioning information to a position monitoring device, so that the position monitoring device may acquire the positioning information of each position acquisition device in the system. The positioning information may be the position information, and may also include the position information and the moving direction.

In an embodiment of the present application, RFID labels are implanted into a floor block.

This embodiment provides a positioning method. The method includes steps 901 to 905.

In step 901, a label coordinate system is established with reference to step 801.

In step 902, an RFID label array is implanted during a floor precast block is manufactured.

In step 903, the floor precast block including positioning information is laid.

In step 904, a position acquisition device reads label information on an RFID label on the ground to position the position acquisition device itself. For example, positioning is performed with reference to step 804.

In step 905, the position acquisition device sends positioning information to a position monitoring device, so that the position monitoring device may acquire the positioning information of each position acquisition device in the system. The positioning information may be position information, and may also include the position information and a moving direction.

In an embodiment of the present application, optical labels or two-dimensional code labels are laid on the ground in a pre-printing or post-printing or attaching manner.

This embodiment provides a positioning method. The method includes step 1001, step 1002, step 1003, step 1004 and step 1005.

In step 1001, a label coordinate system is established.

In an embodiment, a relationship recording database of the optical labels and positions is created.

In an embodiment, after the optical labels are laid, the optical labels may be read and associated with position information.

In an embodiment, the optical labels including the position information and direction information are customized.

In step 1002, a label film on which the two-dimensional code labels with coordinate information are printed or other optical information labels are printed is laid on the ground.

In an embodiment, the two-dimensional code labels or the other optical information labels are directly inscribed on the ground by a field printing method.

In an embodiment, the optical information labels (such as texture features) which are naturally formed by ground processing and laying processes may also be used.

In step 1003, a ground protective layer is laid over the laid optical label array.

In an embodiment, if the optical information labels on the ground have adequate strength, this step may be omitted.

In step 1004, a position acquisition device reads label information on an optical label on the ground to position the position acquisition device itself.

In an embodiment, the database is queried according to the label information to obtain corresponding position information. Alternatively, position information in the optical label is directly read.

In an embodiment, information read from the database is rotated relative to the optical label. The direction information may be acquired in the following manner: for example, when the optical label is made, a direction reference pattern of the optical label is specified, for example, an arrow pointing forward (front, back, left and right directions may be determined) is printed; after information on the optical label is acquired, a graph is obtained and rotated (clockwise or anticlockwise) through image processing software; and when the graph coincides with a direction of the arrow, the direction information of the position acquisition device may be calculated according to a rotated angle of the graph.

In an embodiment, the direction information may also be acquired by reading multiple optical information labels (by a method the same as that in embodiment 8).

In step 1005, the position acquisition device sends positioning information to a position monitoring device, so that the position monitoring device may acquire the positioning information of each position acquisition device in the system. The positioning information may be the position information, and may also include the position information and a moving direction.

In an embodiment of the present application, magnetic stripe labels are pre-written on the floor; or a label floor with a magnetic recording feature is laid and label information is preset in a writing manner.

In step 1101, a label coordinate system is established.

In an embodiment, a relationship recording database of the magnetic stripe labels and positions is created.

In an embodiment, after the magnetic stripe labels are laid, the magnetic stripe labels may be read and associated with position information.

In an embodiment, the magnetic stripe labels are customized, and magnetic stripe information carried in the magnetic stripe labels includes the position information.

In step 1102, a magnetic stripe label film is laid on the ground.

In step 1103, a ground protective layer is laid over the laid magnetic stripe label array.

In an embodiment, if the labels have adequate strength, this step may be omitted.

In step 1104, a position acquisition device reads the label information (the magnetic stripe information in this embodiment) on a magnetic stripe label on the ground to position the position acquisition device itself.

In an embodiment, the magnetic stripe information is compared with the database to position the position acquisition device, or the position information in the magnetic stripe information is directly read to position the position acquisition device.

In an embodiment, direction information may also be acquired by reading multiple magnetic stripe labels (by a method the same as that in step 804).

In step 1105, the position acquisition device sends positioning information to a position monitoring device, so that the position monitoring device may acquire the positioning information of each position acquisition device in the system. The positioning information may be the position information, and may also include the position information and a moving direction.

In an embodiment of the present application, label coordinate information is preset or a floor with label information is laid on the ground of an industrial building or a shopping mall. A label includes uniquely identifiable information, such as a magnetic stripe label, an RFID label and an optical label.

In step 1201, a label coordinate system is established.

In an embodiment, a relationship recording database of labels and positions is created. In an embodiment, after the labels are laid, the labels may be read and associated with position information.

In an embodiment, the labels are customized, and the label information includes the position information.

In step 1202, a label film is laid on each floor of a building to be positioned.

In an embodiment, information labels are laid directly on the ground by a field printing method.

In step 1203, a ground protective layer is laid over the laid label array.

In an embodiment, if the labels have adequate strength, this step may be omitted.

In step 1204, a position acquisition device reads the label information carried on a label on the ground to position the position acquisition device itself.

In an embodiment, the position information is obtained by comparing the read label information with the database.

In an embodiment, coordinate information in the label information is read directly.

In an embodiment, direction information may also be acquired by reading multiple labels (by a method the same as that in step 804).

In step 1205, the position acquisition device sends positioning information to a position monitoring device, so that the position monitoring device may acquire the positioning information of each position acquisition device in the system. The positioning information may be the position information, and may also include the position information and a moving direction.

An embodiment of the present application provides a positioning apparatus, which is applied to a positioning system including a plurality of labels laid with preset positioning precision in an area to be positioned. Each label among the plurality of labels carries label information, where the label information corresponds to position information of a position of the each label. The apparatus includes a memory and a processor.

The memory stores a positioning program.

The processor is configured to read and execute the positioning program stored in the memory. The positioning program, when executed by the processor, performs the following operations: reading first label information on a label at a distance not greater than the preset positioning precision from a position acquisition device; and determining first position information of the position acquisition device according to the first label information.

An embodiment of the present application further provides a computer-readable storage medium, which is configured to store at least one program. The at least one program may be executed by at least one processor to implement operations described below.

First label information on a label at a distance not greater than the preset positioning precision from a position acquisition device is read.

First position information of the position acquisition device is determined according to the first label information.

In an embodiment, the above program is executed to implement the positioning method in the embodiments described above. Therefore, after the program is executed by the processor, other operations implemented by the program may refer to the related description in the positioning method.

This embodiment provides a positioning apparatus, which is applied to a system including a plurality of labels laid with preset positioning precision in an area to be positioned. Each label among the plurality of labels carries label information, where the label information corresponds to position information of a position of the each label. The positioning apparatus includes a memory and a processor, where the memory stores a program which, when read and executed by the processor, performs operations described below.

First label information sent by a position acquisition device is received, where the first label information is on a label at a distance not greater than preset positioning precision from the position acquisition device.

First position information of the position acquisition device is determined according to the first label information.

An embodiment of the present application further provides a computer-readable storage medium, which is configured to store at least one program. The at least one program may be executed by at least one processor to implement the positioning method described above. For example, the at least one program implements steps described below.

First label information sent by a position acquisition device is received, where the first label information is on a label at a distance not greater than preset positioning precision from the position acquisition device.

First position information of the position acquisition device is determined according to the first label information.

A computer storage medium includes a USB disk, a read-only memory (ROM), a random access memory (RAM), a mobile hard disk, a magnetic disk, an optical disk or another medium capable of storing program codes.

What is claimed is:

1. A positioning method, which is applied to a positioning system comprising a plurality of labels laid with preset positioning precision in an area to be positioned, wherein each label among the plurality of labels carries label information, and the label information corresponds to position information of a position of the each label, wherein the method comprises:
   reading, by a position acquisition device, first label information on a first label at a distance equal to or less than the preset positioning precision from the position acquisition device; and
   determining, by the position acquisition device, first position information of the position acquisition device according to the first label information; and
wherein the method further comprises:
   acquiring a moving direction of the position acquisition device through a direction positioning device, wherein the direction positioning device is configured to acquire a vector between a position before the position acquisition device moves and a position after the position acquisition device moves, to determine the moving direction of the position acquisition device.

2. The method of claim 1, wherein determining, by the position acquisition device, the first position information of the position acquisition device according to the first label information comprises one of:
   directly determining, by the position acquisition device, the first position information of the position acquisition device according to the first label information, wherein the first label information comprises position information of a position of the first label; or
   querying, by the position acquisition device, a database according to the first label information, and acquiring position information corresponding to the first label information from the database as the first position information of the position acquisition device.

3. The method of claim 1, further comprising:
   determining whether the position acquisition device is static;
   in response to determining that the position acquisition device is static, reading, in a direction for the position acquisition device to move, second label information on a second label at a distance greater than the preset positioning precision from the position acquisition device, determining second position information according to the second label information, and determining the moving direction of the position acquisition device according to the first position information and the second position information.

4. The method of claim 1, further comprising:
   after moving from a current position to a second position, reading, by the position acquisition device, second label information on a second label at a distance equal to or less than the preset positioning precision from the position acquisition device, determining second position information according to the second label information, and determining a moving direction of the position acquisition device according to the first position information and the second position information.

5. The method of claim 1, wherein
the each label comprises a direction reference pattern, wherein the direction reference pattern points to a preset direction; and
the first label information comprises a graph; and the method further comprising:
rotating the graph; and
in response to determining that a direction reference pattern in the graph coincides with a direction reference pattern in a reference graph, determining direction information of the position acquisition device according to a rotated angle of the graph.

6. The method of claim 1, wherein the each label comprises at least one of:
a radio frequency identification label, a magnetic stripe label, or an optical label.

7. The positioning method of claim 1, further comprising:
sending, by the position acquisition device, the first position information to a position monitoring device.

8. A positioning apparatus, which is applied to a positioning system comprising a plurality of labels laid with preset positioning precision in an area to be positioned, wherein each label among the plurality of labels carries label information, and the label information corresponds to position information of a position of the each label, the positioning apparatus comprises a memory and a processor, wherein
the memory stores a positioning program;
the processor is configured to read and execute the positioning program stored in the memory; wherein the positioning program, when executed by the processor, performs the positioning method of claim 1.

9. A positioning method, which is applied to a positioning system comprising a plurality of labels laid with preset positioning precision in an area to be positioned, wherein each label among the plurality of labels carries label information, and the label information corresponds to position information of a position of the each label, wherein the method comprises:
receiving, by a position monitoring device, first label information sent by a position acquisition device, wherein the first label information is on a first label at a distance equal to or less than the preset positioning precision from the position acquisition device ; and
determining, by the position monitoring device, first position information of the position acquisition device according to the first label information and
wherein the method further comprises at least one of:
receiving, by the position monitoring device, second label information sent by the position acquisition device, wherein the second label information is on a second label in a direction for the position acquisition device to move and at a distance greater than the preset positioning precision from the position acquisition device; and
determining, by the position monitoring device, second position information according to the second label information, and determining a moving direction of the position acquisition device according to the first position information and the second position information; or receiving, by the position monitoring device, third label information sent by the position acquisition device, wherein the third label information is on a third label at a distance equal to or less than the preset positioning precision from the position acquisition device after the position acquisition device moves from a current position to a third position; and determining, by the position monitoring device, third position information according to the third label information, and determining a moving direction of the position acquisition device according to the first position information and the third position information.

10. The method of claim 9, wherein determining, by the position monitoring device, first position information of the position acquisition device according to the first label information comprises one of:
directly determining, by the position monitoring device, the first position information of the position acquisition device according to the first label information, wherein the first label information comprises position information of a position of the first label; or
querying, by the position monitoring device, a database according to the first label information, and acquiring position information corresponding to the first label information from the database as the first position information of the position acquisition device.

11. The method of claim 9, wherein the each label comprises at least one of:
a radio frequency identification label, a magnetic stripe label, or an optical label.

12. A positioning apparatus, which is applied to a positioning system comprising a plurality of labels laid with preset positioning precision in an area to be positioned, wherein each label among the plurality of labels carries label information, and the label information corresponds to position information of a position of the each label, wherein the positioning apparatus comprises a memory and a processor, the memory stores a program, the program, when read and executed by the processor, performs the positioning method of claim 9.

* * * * *